United States Patent
Schürmann et al.

(10) Patent No.: US 10,618,840 B2
(45) Date of Patent: Apr. 14, 2020

(54) METHOD FOR PRODUCING A REFLECTOR ELEMENT AND REFLECTOR ELEMENT

(71) Applicants: Fraunhofer-Gesellschaft zur Förderung der angewandten Forschung e.V., München (DE); Friedrich-Schiller-Universität Jena, Jena (DE)

(72) Inventors: Mark Schürmann, Jena (DE); Stefan Schwinde, Jena (DE); Robert Müller, Niedertreba (DE); Norbert Kaiser, Jena (DE)

(73) Assignees: Fraunhofer-Gesellschaft zur Foerderung der angewandten Forschung e.V., Munich (DE); Friedrich-Schiller-Universitaet Jena, Jena (DE)

( * ) Notice: Subject to any disclaimer, the term of this patent is extended or adjusted under 35 U.S.C. 154(b) by 150 days.

(21) Appl. No.: 15/557,441

(22) PCT Filed: Mar. 9, 2016

(86) PCT No.: PCT/EP2016/055036
§ 371 (c)(1),
(2) Date: Sep. 11, 2017

(87) PCT Pub. No.: WO2016/142428
PCT Pub. Date: Sep. 15, 2016

(65) Prior Publication Data
US 2018/0029931 A1    Feb. 1, 2018

(30) Foreign Application Priority Data
Mar. 10, 2015 (DE) .......... 10 2015 103 494

(51) Int. Cl.
*C03C 17/36* (2006.01)
*C03C 17/34* (2006.01)
(Continued)

(52) U.S. Cl.
CPC .......... *C03C 17/3663* (2013.01); *B05D 3/007* (2013.01); *C03C 17/3411* (2013.01);
(Continued)

(58) Field of Classification Search
CPC ..................................................... B05D 3/007
See application file for complete search history.

(56) References Cited

U.S. PATENT DOCUMENTS 6,736,942 B2 * 5/2004 Weihs ................. B23K 1/0006
204/192.12
9,588,338 B2  3/2017 Hannweber et al.
(Continued)

FOREIGN PATENT DOCUMENTS

DE  102012202047 A1  1/2013
DE  102013001417 A1  7/2014
DE  102013009835 A1  12/2014

OTHER PUBLICATIONS

Picard, Appl. Phys. Lett. 88, 144102 (2006).*
(Continued)

*Primary Examiner* — James M Mellott
(74) *Attorney, Agent, or Firm* — Slater Matsil, LLP (57) ABSTRACT

A method for producing a reflector element and a reflector element are disclosed. In an embodiment the method includes depositing a layer sequence on a substrate, wherein the layer sequence includes at least one mirror layer and at least one reactive multilayer system and igniting the reactive multilayer system in order to activate heat input in the layer sequence.

12 Claims, 5 Drawing Sheets

(51) Int. Cl.
*C06B 45/14* (2006.01)
*G02B 5/08* (2006.01)
*G02B 1/14* (2015.01)
*B05D 3/00* (2006.01)

(52) U.S. Cl.
CPC ...... *C03C 17/3488* (2013.01); *C03C 17/3621* (2013.01); *C03C 17/3639* (2013.01); *C03C 17/3644* (2013.01); *C03C 17/3649* (2013.01); *C06B 45/14* (2013.01); *G02B 1/14* (2015.01); *G02B 5/085* (2013.01); *G02B 5/0808* (2013.01); *G02B 5/0833* (2013.01); *G02B 5/0858* (2013.01); *C03C 2217/214* (2013.01); *C03C 2217/228* (2013.01); *C03C 2217/252* (2013.01); *C03C 2217/254* (2013.01); *C03C 2217/255* (2013.01); *C03C 2217/256* (2013.01); *C03C 2217/258* (2013.01); *C03C 2217/26* (2013.01); *C03C 2217/285* (2013.01); *C03C 2217/78* (2013.01); *C03C 2218/156* (2013.01); *C03C 2218/17* (2013.01); *C03C 2218/32* (2013.01)

(56) References Cited

U.S. PATENT DOCUMENTS

2001/0046597 A1 11/2001 Weihs et al.
2013/0330567 A1 12/2013 Woll et al.
2016/0011413 A1* 1/2016 Hannweber .......... G02B 7/1821
                                                                359/225.1

OTHER PUBLICATIONS

Knight, The Oxidation of Aluminum, https://www.corrosionpro.com/blog/the-oxidation-of-aluminum/; Jul. 30, 2014.*
Namazu, T. et al., "Self-Propagating Explosive Reactions in Nanostructured Al/Ni Multilayer Films as Localized Heat Process Technique for MEMS," IEEE MEMS 2006, Istanbul, Turkey, Jan. 22-26, 2006, 4 pages.

* cited by examiner

METHOD FOR PRODUCING A REFLECTOR ELEMENT AND REFLECTOR ELEMENT

This patent application is a national phase filing under section 371 of PCT/EP2016/055036, filed Mar. 9, 2016, which claims the priority of German patent application 10 2015 103 494.8, filed Mar. 10, 2015, each of which is incorporated herein by reference in its entirety.

TECHNICAL FIELD

The invention is directed to a method for producing a reflector element and a reflector element.

BACKGROUND

Numerous applications of precision optical components require reflector elements with a mirror layer that is highly reflective over a broad spectral range, for example, for applications in astronomy or in space optics (for example, for observation of the Earth). Metals show high reflectance over a broad spectrum. Depending on the spectral range, gold, aluminum, or silver are generally used for reflectors.

Gold possesses highly favorable chemical resistance and high reflectance in the IR range. Aluminum shows high reflectance up to the UV range. Of all metals, silver shows the highest reflectance from the VIS- up to the IR range. Like electrical conductivity, reflectance is also dependent on the number of defects in the respective metal (Drude theory). In order to achieve high targeted reflectance, a metal layer that is as defect-free and smooth as possible is necessary. Solutions for reflectors are also known in which metals are combined. For special applications, a targeted desired ratio of transmitted to reflected light can be set (beam splitter). Thin metal layers can be used for this purpose.

In reflectors requiring a maximum reflectance over a limited spectral bandwidth and angle of incidence range, purely dielectric layers (without a reflecting metal layer) can be used to adjust the reflectance. In these reflectors, the interference effect is used. A plurality of layers of dielectric materials having differing refractive indices are combined.

In both reflectors having a dielectric layer system and reflectors based on the reflectance of metals, aging effects and defects may occur. In metals in particular, there is the risk of corrosion. In order to prevent this, the metal layers are often equipped with a protective layer.

While applications without applied protective layers exist for aluminum and gold, silver reflectors are virtually always provided with a protective layer. The production of protected reflectors in front side mirrors that must show maximum reflectivity over a broad spectral range is particularly demanding, as the protective layers affect the optical function of the layers. Only certain dielectric materials can be used for the protective layer in order to keep the negative effect on optical performance as low as possible. A targeted increase in reflecting in certain spectral areas can be achieved by utilizing the interference effect through a combination of different dielectric materials as a protective layer.

For example, for protection and increasing the reflectance of metallic reflectors, protective layers can be deposited on the reflecting metal by means of PVD, CVD or ALD. By means of this method, the dielectric materials in question can be deposited on the reflectors with precisely defined layer thicknesses. Deposition parameters with low process temperatures (generally T<150° C.) are selected. As a rule, subsequent thermal treatments at T>150° C. are dispensed with. High temperatures are avoided in order to prevent warping of the reflector. For example, different thermal expansion coefficients of the layer and substrate in combination with major temperature fluctuations can lead to warping.

In order to achieve precise guidance in an optical instrument, no warping can be allowed, or high dimensional accuracy of the reflector must be preserved. In addition, many substrates are temperature-sensitive. High temperatures or rapid temperature changes would damage such substrates.

From other standpoints, however, high temperatures can lead to an improvement of the reflector. For example, deposition at the lowest possible temperature allows the dielectric layers to be porous. In this state, some materials form layers that are not moisture-tight (moisture can pass through the layer to the metal layer to be protected), or they are readily soluble (in a moist environment, the layer is dissolved and thus decomposes over time). Conversion to a more stable state would be possible by means of thermal treatment, for example, in a furnace. In addition, such thermal treatment or deposition at high temperature could reduce the absorption of transparent layers or improve the reflectance of metal layers. However, this is impossible or possible only to a very limited extent because of the resulting temperature effect on the substrate and partially also on the metal layer to be protected.

SUMMARY OF THE INVENTION

Embodiments provide an improved reflector element and a method for producing an improved reflector element. More particularly, embodiments provide a reflector element that is characterized by improved reflectance and/or improved resistance.

According to an embodiment of the method for the production of a reflector element, a layer sequence is deposited, wherein the layer sequence comprises at least one mirror layer and at least one reactive multilayer system. For example, the layer sequence can be deposited on the surface of a substrate or on the surface of a preferably polished layer applied to a substrate. The substrate and/or the layer applied thereto can be flat or curved. The reflector element can be used, for example, for applications in precision optics. More particularly, the reflector element can be provided for applications in astronomy and or for applications in space, for example, for observation of the Earth.

The mirror layer in the layer sequence of the reflector element may comprise a reflecting single layer, more particularly a metal layer, or a reflecting layer system, more particularly a dielectric interference layer system.

The reactive multilayer system advantageously contains a plurality of alternating layers. The alternating layers preferably show a periodic arrangement. More particularly, the reactive multilayer system contains a plurality of layer pairs, each of which is composed of a first layer of a first material and a second layer of a second material. The first material and the second material are selected such that they can form a compound in an exothermic reaction.

It is possible for the first and second layers of the layer pairs to be separated respectively by a diffusion barrier of a third material. For example, this can prevent a premature reaction of the materials, e.g., during the coating process. The reaction is advantageously begun only when a defined minimum energy input, which depends on the material of the diffusion barrier, is reached. For example, the diffusion barrier may contain carbon or be composed thereof.

In the method for the production of the reflector element, the reactive multilayer system is ignited in order to provide heat input into the layer sequence. The ignition of the reactive multilayer system occurs by means of an energy input, for example, using a laser or by applying an electric voltage. In this manner, the exothermic reaction between the materials of the alternating layers of the reactive multilayer system is triggered. In this process, there is a decrease in the binding enthalpy in the formation of a mixed phase/alloy. A self-propagating exothermic reaction takes place, wherein the resulting reaction heat is released into the environment. The ignition of the reactive multilayer system advantageously allows a one-time, explosion-like release of heat combined with subsequent propagation thereof. The explosion-like release can begin from room temperature.

The heat emission from the ignited reactive multilayer system advantageously takes place only locally in the vicinity of the reactive multilayer system. Because of the low thermal capacity of the reactive multilayer system, compared to total heating of the reflector element, such as during annealing in a furnace, a negative thermal affect on the entire reflector element on ignition of the reactive multilayer system can advantageously be prevented. More particularly, an undesirable deformation of the substrate due to the local short-term heat input into the layer sequence can be prevented. High temperatures occur only for fractions of seconds in the area of the reactive multilayer system and its immediate vicinity.

More particularly, in this manner, heat input can take place into a layer adjacent to the reactive multilayer system, specifically the mirror layer or protective layer provided to protect the mirror layer. This heat input can be used to advantageously modify the layer characteristics. More particularly, in this manner, an increase in the reflectance and/or an improvement in the environmental resistance of the layer sequence can be achieved. Because of the highly local heat input, a mirror layer or protective layer with improved stability and/or increased reflectance can be produced on a mirror layer substrate without deforming or damaging said substrate.

By selecting the materials of the reactive multilayer system, the number of interfaces and the layer thicknesses, the temperature, amount of heat, and propagation speed to be achieved by the reaction can be determined. By adjusting these parameters and adjusting the reflective layer system (material combinations and thickness of the layers) the heat input can be adjusted over a wide range. Because of the reaction heat, an adiabatic temperature of up to 3000° C. at the interface is possible, for example, by using the material pair Hf and C.

Preferred material combinations for the reactive multilayer system are: Ti and B (reacting to $TiB_2$), Zr and B (as to $ZrB_2$), Hf and B (reacting to $HfB_2$), V and B (reacting to $VB_2$), Nb and B (reacting to $NbB_2$), Ta and B (reacting to $TaB_2$), Ti and C (reacting to TiC), Zr and C (reacting to ZrC), Hf and C (reacting to HfC), V and C (reacting to VC), Nb and C (reacting to NbC), Ta and C (reacting to TaC), Ti and Si (reacting to $Ti_5Si_3$), Zr and Si (reacting to $Zr_5Si_3$), Hf and Si (reacting to $Hf_5Si_3$), V and Si (reacting to $V_5Si_3$), Nb and Si (reacting to $Nb_5Si_3$), Ta and Si (reacting to $Ta_5Si_3$), Ti and Al (reacting to TiAl), Zr and Al (reacting to ZrAl), Hf and Al (reacting to HfA), Ni and Al (reacting to NiAl), Pd and Al (reacting to PdAl), Pt and Al (reacting to PtA), Sc and Au (reacting to ScAu), Sc and Cu (reacting to ScCu), Sc and Ag (reacting to ScAg), Y and Au (reacting to YAu), Y and Cu (reacting to YCu), Y and Ag (reacting to YAg), and Ru and Al (reacting to RuAl).

For example, the reactive multilayer system is deposited by a PVD method (such as thermal evaporation, electron beam evaporation, plasma-assisted evaporation, magnetron sputtering, or ion beam sputtering), a CVD method or an ALD (atomic layer deposition) method.

The reactive multilayer system preferably contains at least 20 layers, more particularly between 20 and 1000 layers. The reactive multilayer system advantageously contains at least 10 layer pairs, each composed of a first layer of a first material and a second layer of a second material. The thicknesses of the layers of the reactive multilayer system are preferably between 5 nm and 500 nm. The total thickness of the reactive multilayer system is advantageously between 0.1 µm and 200 µm, preferably between 0.5 µm and 5 µm. Such a reactive multilayer system is advantageous for producing a temperature suitable for modifying the layer properties of at least one layer of the layer sequence.

In a preferred embodiment of the reflector element, the mirror layer is a metal layer. The metal layer may contain special gold, aluminum, silver, copper, rhodium, platinum, or iridium. Like electrical conductivity, the reflectance of a metal layer strongly depends on the microstructure of the metal layer. Defects such as grain boundaries lead to a reduction in reflectance. A rough surface leads to undirected reflection (scattering). The best reflectance can therefore be achieved with a smooth layer and as few defects as possible. Through the heat input on ignition of the reactive multilayer system, the metal layer can be advantageously modified without negatively affecting the substrate and the dimensional stability. The heat input on ignition of the reactive multilayer system can cause brief local melting of the metal layer. This gives rise to large grains that provide better conductivity and reflectance of the metal layer. At the same time, however, the roughness of the metal layer remains low or even decreases, thus preventing increased scattering losses.

Preferably, the mirror layer has a partial open area in order to allow local direct access to the reactive multilayer system. This may be necessary for ignition of the reaction.

In a preferred embodiment the mirror layer has a subsequent protective layer, which more particularly serves to protect the mirror layer from environmental effects. This is more particularly advantageous in cases where the mirror layer is a metal layer such as a silver layer. The protective layer may be a single layer or preferably comprises a plurality of partial layers. More particularly, the protective layer may contain one or a plurality of dielectric layers. In order to obtain high reflectance or a uniform and wavelength-independent optical performance, dielectric layer materials are preferably exclusively used for the partial layers of the protective layer that are transparent in the spectral range in which the reflector element is to be used. More particularly, these can be oxides or nitrides such as $SiO_2$, $Si_3N_4$, $Al_2O_3$, AlN, $ZrO_2$, ZrN, $HfO_2$, HfN, $TiO_2$, TiN, $Ta_2O_5$, TaN, $Nb_2O_5$, NbN, $Y_2O_3$, YN, MgO, fluorides such as $MgF_2$, LiF, $AlF_3$, $LaF_3$, $GdF_3$, semiconductors such as Si or SiC, conductive transparent materials such as ITO or AZO, or mixtures of these materials. Preferably, like the protective layer, the mirror layer has at least one partial open area in order to allow local direct access to the reactive multilayer system. This may be necessary for ignition of the reaction.

The layer materials of the protective layer should be as transparent as possible in the respective area of application. Because of the low deposition temperature, the layer materials (depending on the material), are in an amorphous or polycrystalline state and have numerous pores—some of them open. By means of the heat input from the reactive multilayer system, the protective layer can be converted to a more stable state without negatively affecting the substrate and the dimensional stability. Because of the heat input, the density of the layers can be increased and the porosity reduced, and/or the layers are converted to a more stable (polycrystalline) phase. This allows a substantially higher resistance to be achieved.

The layer sequence advantageously contains at least one adhesive layer. The adhesive layer can be applied in the production of the layer sequence, for example, by means of a PVD method such as thermal evaporation, electron beam evaporation, plasma-assisted evaporation, magnetron sputtering, or ion beam sputtering. Alternatively, a CVD (chemical vapour deposition) method or an ALD (atomic layer deposition) method can be used to apply the adhesive layer. The adhesive layer more particularly has the function of improving the adhesion of a layer arranged thereupon, for example, of the reactive multilayer system, the mirror layer or the protective layer. The at least one adhesive layer may be arranged, for example, between the substrate and the reactive multilayer system, between the reactive multilayer system and the mirror layer and/or between the mirror layer and the protective layer. Moreover, the adhesive layer can simultaneously have the function of a diffusion barrier layer. In its capacity as a diffusion barrier layer, the adhesive layer can more particularly reduce the diffusion between components of a substrate of the reflector element and the layers arranged thereupon.

The adhesive layer can be an individual layer or a series of a plurality of layers. Suitable materials for the adhesive material include Cr, Ti, Cu, Ru, Mo, W, low melting metals such as soldering material, semiconductors such as Si or SiC, dielectric layers such as $SiO_2$, $Si_3N_4$, $Al_2O_3$, AlN, $ZrO_2$, ZrN, $HfO_2$, HfN, $Ta_2O_5$, TaN, $Nb_2O_5$, NbN, $Y_2O_3$, YN or mixtures of these materials. The adhesive layer preferably has a thickness of between 5 nm and 2000 nm.

Alternatively or additionally to a metal layer, the mirror layer may have a dielectric interference layer system. The dielectric interference layer system may function as a single mirror layer or may be applied to a metal layer to increase reflectance. The dielectric interference layer system advantageously has alternating low-refractive dielectric layers with a refractive index of n1 and high-refractive dielectric layers with a refractive index of n2>n1. The terms "low-refractive" and "high-refractive" are to be understood relative to the refractive index of the other type of layer of the alternating layers respectively. More particularly, low-refractive layers are understood to be layers that have a refractive index of n1≤1.6. High-refractive layers are more particularly understood to be layers that have a refractive index of n2>1.6, preferably n2>2.0. The dielectric interference layer system comprises, for example, at least five, and preferably at least ten alternating high-refractive and low-refractive layers.

The dielectric interference layer system can more particularly contain oxides or nitrides such as $SiO_2$, $Si_3N_4$, $Al_2O_3$, AlN, $ZrO_2$, ZrN, $HfO_2$, HfN, $TiO_2$, TiN, $Ta_2O_5$, TaN, $Nb_2O_5$, NbN, $Y_2O_3$, YN, MgO, fluorides such as $MgF_2$, LiF, $AlF_3$, $LaF_3$, $GdF_3$, semiconductors such as Si or SiC, conductive transparent materials such as ITO or AZO, or mixtures of these materials. The heat input into the dielectric interference layer system on ignition of the reactive multilayer system has the advantages that were explained above in connection with the protective layer. More particularly, because of the heat input, the density of the layers can be increased and the porosity reduced, and/or the layers are converted to a more stable (polycrystalline) phase. This allows a substantially higher resistance to be achieved.

The heat input of the reactive multilayer system into the layer sequence of the reflector element produced in this method is also advantageous in that favorable adhesion to the substrate and between the layers can be achieved and/or the layer stress can be reduced without negatively affecting the substrate and the dimensional stability. The heat input causes improved adhesion, because the increased mobility of the layer particles allows better wetting and better binding at the interfaces. The reduced layer stress results form a relaxation process that is made possible by the heat input and can be reduced by the intrinsic layer stresses.

The reduction of stress is of particular importance in layer sequences with relatively thick and numerous dielectric layers. More particularly, these include layer sequences which as a mirror layer have a dielectric interference layer system or a metal layer on which a dielectric interference layer system is additionally deposited in order to increase reflectance. More particularly, the better adhesion to the substrate or between the layers increases the stability of reflector elements to which a noble metal layer is applied as a mirror layer or which are exposed to major thermomechanical stresses.

The reflector element producible by the method described herein has a layer sequence applied to a substrate, wherein the layer sequence has at least one mirror layer and at least one layer producible by ignition of a reactive multilayer system. The layer sequence may also contain one or a plurality of the above described layers, more particularly one or a plurality of adhesive layers and/or one or a plurality of protective layers.

More particularly, the reflector element has a layer that is produced by ignition of a reactive multilayer system. Specifically, the reflector element may contain a layer that has a compound of at least one of the following material pairs: Ti and B, Zr and B, Hf and B, V and B, Nb and B, Ta and B, Ti and C, Zr and C, Hf and C, V and C, Nb and C, Ta and C, Ti and Si, Zr and Si, Hf and Si, V and Si, Nb and Si, Ta and Si, Ti and Al, Zr and Al, Hf and Al, Ni and Al, Pd and Al, Pt and Al, Sc and Au, Sc and Cu, Sc and Ag, Y and Au, Y and Cu, Y and Ag, Ru and Al. The compound is advantageously produced by the exothermic reaction between the different materials of the reactive multilayer system. The resulting compound may at least in some areas have a stoichiometric composition. The layer producible by ignition of the reactive multilayer system may more particularly contain at least one of the following compounds: $TiB_2$, $ZrB_2$, $HfB_2$, $VB_2$, $NbB_2$, $TaB_2$, TiC, ZrC, HfC, VC, NbC, TaC, $TiSi_3$, $Zr_5Si_3$, $Hf_5Si_3$, $V_5Si_3$, $Nb_5Si_3$, $Ta_5Si_3$, TiAl, ZrAl, HfAl, NiAl, PdAl, PtAl, ScAu, ScCu, ScAg, YAu, YCu, YAg, and RuAl. It is also possible for the compound produced by ignition of the reactive multilayer system to have a non-stoichiometric composition, either entirely or in areas.

Further advantageous embodiments of the reflector element can be derived from the above description of the method and vice versa.

BRIEF DESCRIPTION OF THE DRAWINGS

The invention is explained in greater detail below with respect to embodiments in connection with FIGS. 1 through 4.

The figures are as follows.

Identical components or components having the same action are indicated in the figures with the same respective reference numbers. The components shown and the size ratios of the components to one another are also not to be understood as being to scale.

DETAILED DESCRIPTION OF ILLUSTRATIVE EMBODIMENTS

Figure 1A:
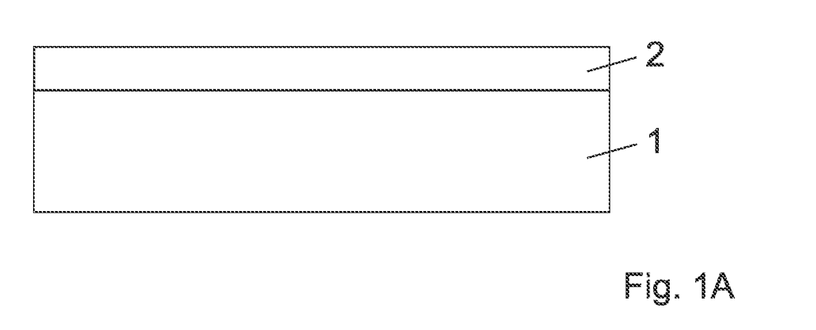
FIGS. 1A through 1G show a schematic representation of an embodiment of the method for the production of the reflector element by means of intermediate steps.

In the embodiment of the method, in the first step shown in FIG. 1A, an adhesive layer 2 is applied to a substrate 1. The substrate 1 can be a flat or curved substrate and, for example, contain glass, plastic, metal, or a ceramic. The substrate 1 preferably has a surface with low roughness, it is also possible to apply a preferably polished technical-grade layer to substrate 1 (not shown). Like the subsequent layers described below, the adhesive layer 2 can be applied, for example, by means of a PVD method (such as thermal evaporation, electron beam evaporation, plasma-assisted evaporation, magnetron sputtering, or ion beam sputtering), a CVD method or an ALD method.

The adhesive layer 2 is more particularly used to improve adhesion of the subsequent layers to the substrate 1. The adhesive layer 2 can simultaneously serve as a diffusion barrier. Moreover, the adhesive layer 2 can be used to regulate the heat input that is released by the reaction of the reactive multilayer system and can also affect the substrate 1. The adhesive layer 2 can be an individual layer or a combination of a plurality of thin layers. Suitable layer materials are all materials that ensure favorable adhesion of the reactive multilayer system to the substrate. More particularly, these can be metals such as Cr, Ti, Cu, Ru, Mo, W, low melting metals such as soldering material, semiconductors such as Si or SiC, dielectric layers such as $SiO_2$, $Si_3N_4$, $Al_2O_3$, AlN, $ZrO_2$, ZrN, $HfO_2$, HfN, $Ta_2O_5$, TaN, $Nb_2O_5$, NbN, $Y_2O_3$, YN or mixtures of these materials. The thickness of the adhesive layer 2 is between 5 nm and 2000 nm, preferably between 10 nm and 100 nm.

Figure 1B:
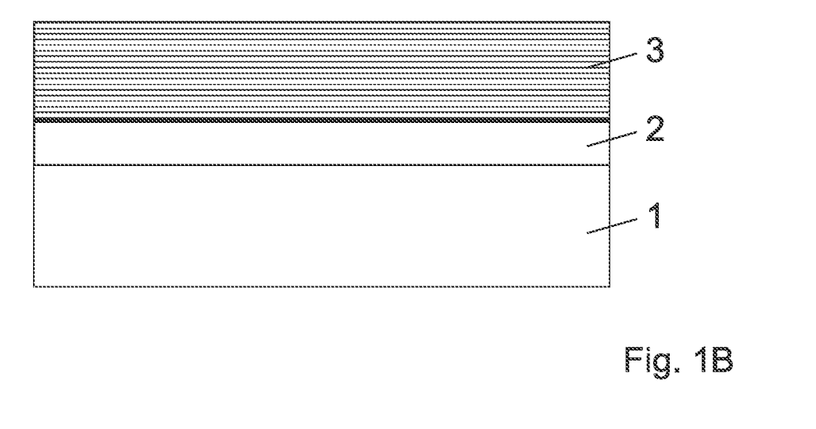

In the second step shown in FIG. 1B, at least one reactive multilayer system 3 is applied to the adhesive layer 2. The reactive multilayer system 3 contains a preferably periodic layer stack of alternating layers, the materials of which can form a compound in an exothermic reaction. More particularly, suitable material combinations for the reactive multilayer system 3 are as follows: Ti and B (reacting to $TiB_2$), Zr and B (reacting to $ZrB_2$), Hf and B (reacting to $HfB_2$), V and B (reacting to $VB_2$), Nb and B (reacting to $NbB_2$), Ta and B (reacting to $TaB_2$), Ti and C (reacting to TiC), Zr and C (reacting to ZrC), Hf and C (reacting to HfC), V and C (reacting to VC), Nb and C (reacting to NbC), Ta and C (reacting to TaC), Ti and Si (reacting to $Ti_5Si_3$), Zr and Si (reacting to $Zr_5Si_3$) Hf and Si (reacting to $Hf_5Si_3$), V and Si (reacting to $V_5Si_3$), Nb and Si (reacting to $Nb_5Si_3$), Ta and Si (reacting to $Ta_5Si_3$), Ti and Al (reacting to TiAl), Zr and Al (reacting to ZrAl), Hf and Al (reacting to HfAl), Ni and Al (reacting to NiAl), Pd and Al (reacting to PdAl), Pt and Al (reacting to PtAl) Sc and Au (reacting to ScAu), Sc and Cu (reacting to ScCu), Sc and Ag (reacting to ScAg), Y and Au (reacting to YAu), Y and Cu (reacting to YCu), Y and Ag (reacting to YAg), and Ru and Al (reacting to RuAl).

The thickness of the reactive multilayer system 3 is between 0.1 m and 200 dm, preferably between 0.5 μm and 5 μm.

Figure 1C:
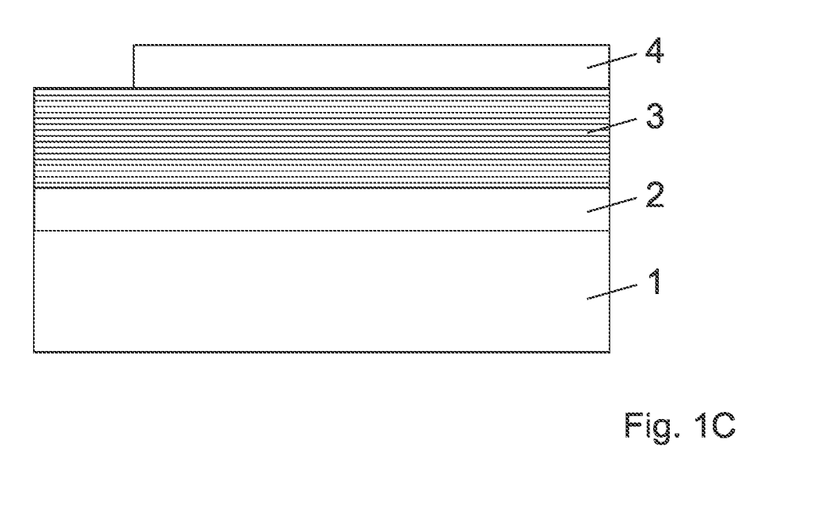

In an optional third step shown in FIG. 1C, a second adhesive layer 4 can be applied to the reactive multilayer system 3 that can simultaneously serve as a diffusion barrier that prevents diffusion between the reactive multilayer system 3 and the metal layer applied in the following method step. Advantageous embodiments of the second adhesive layer 4 correspond to the above-described adhesive layer 2. Preferably, as in all subsequent layers, there is at least one partial open area in the second adhesive layer 4 in order to allow local direct access to the reactive multilayer system 3. This may be necessary for ignition of the reaction.

Figure 1D:
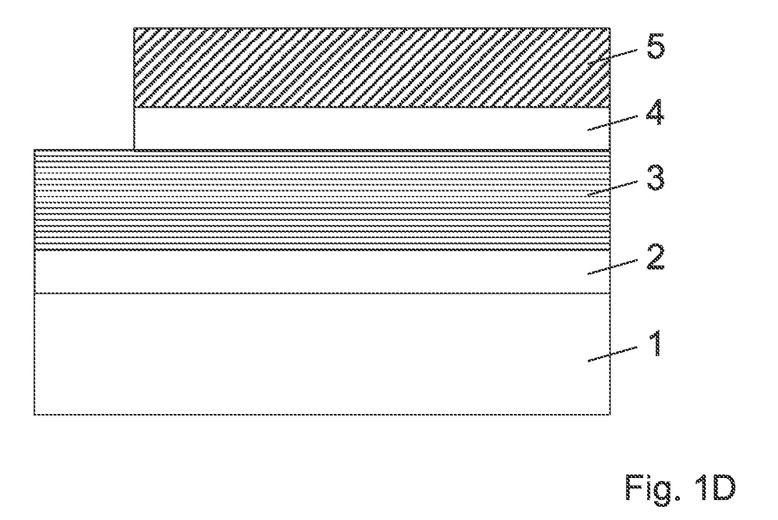

In a fourth step shown in FIG. 1D, a broad-band reflecting metal layer 5 is applied as a mirror layer to the second adhesive layer 4. The metal layer 5 preferably contains a high-reflective metal such as Au, Al, Ag, Cu, Rh, Pt or Ir or an alloy of these metals. The thickness of the metal layer 5 is preferably adapted to the energy being released from the reactive multilayer system 3, and, for example, can be between 10 nm and 5000 nm. Preferably, as for all of the subsequent layers, there is a partial open area in the metal layer 5 in order to allow local direct access to the reactive multilayer system 3. This may be necessary for ignition of the reaction.

Figure 1E:
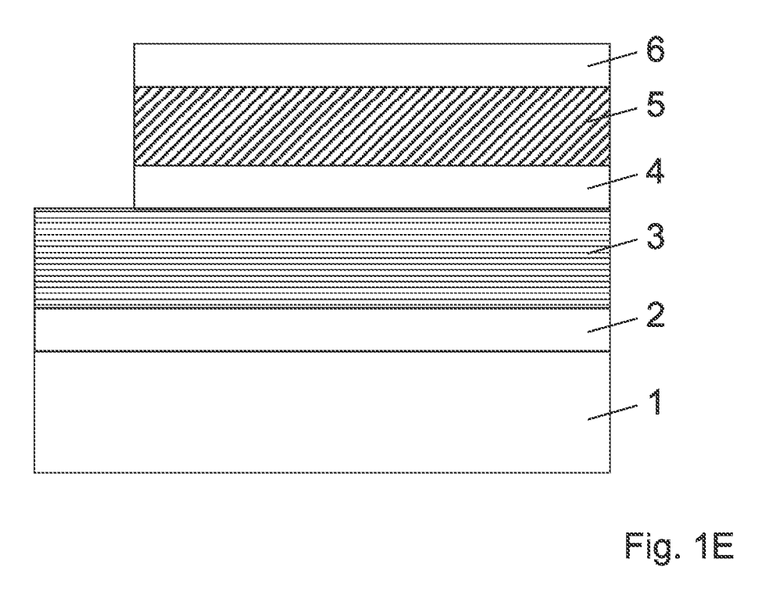

In an optional fifth step shown in FIG. 1E, a third adhesive layer 6 can be applied to the reflecting metal layer 5 that can simultaneously serve as a diffusion barrier that prevents diffusion between the metal layer 5 and a subsequent protective layer. The third adhesive layer 6 may be both a single layer or a combination of a plurality of thin layers. Suitable layer materials are all materials that ensure favorable adhesion of the protective layer to the metal layer 5. At the same time, the third adhesive layer 6 must have as little effect as possible on the reflectance of the underlying high-reflective metal layer 5. The third adhesive layer 6 is therefore preferably as thin as possible and/or composed of a material having suitable optical properties. Suitable are metals such as Cr, Ti, Cu, Ru, Mo, W, semiconductors such as Si or SiC, dielectric layers such as $SiO_2$, $Si_3N_4$, $Al_2O_3$, AlN, $ZrO_2$, ZrN, $HfO_2$, HfN, $Ta_2O_5$, TaN, $Nb_2O_5$, NbN, $Y_2O_3$, YN, fluorides such as $MgF_2$, $AlF_3$, LiF, $LaF_3$, $GdF_3$, or mixtures of these materials. The thickness of the third adhesive layer 6 is between 0.5 nm and 100 nm, preferably between 1 nm and 30 nm. Preferably, as for all of the subsequent layers, there is a partial open area in the adhesive layer 6, in order to allow local direct access to the reactive multilayer system 3. This may be necessary for ignition of the reaction.

Figure 1F:
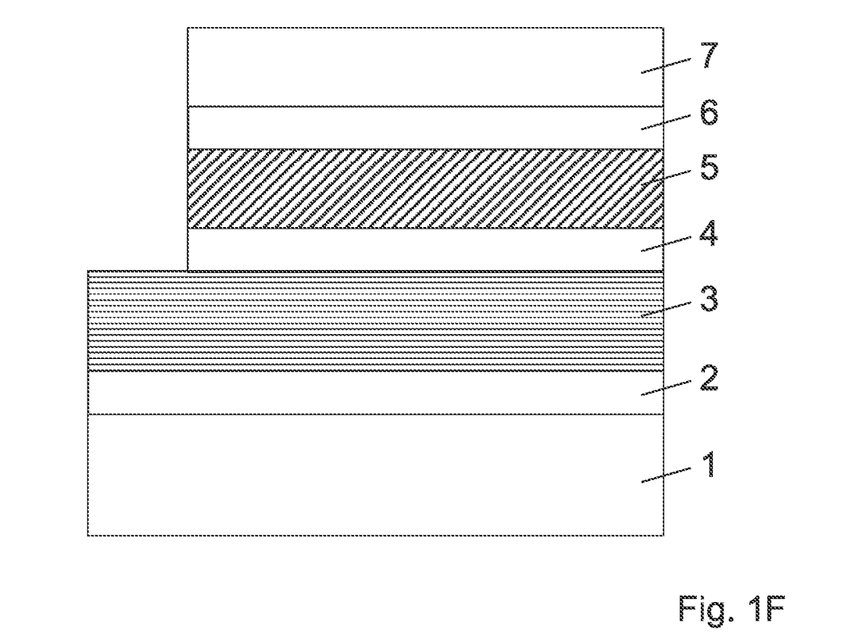

In a sixth step, which is shown in FIG. 1F, a protective layer 7 is deposited on the metal layer 5 or on the third adhesive layer 6. The protective layer 7 may be composed of one or a plurality of dielectric layers. In order to obtain a high degree of reflectance or a uniform and wavelength-independent optical performance, the protective layer 7 has a plurality of dielectric layer materials that are transparent in the spectral range in which the reflector element is to be used. More particularly, the protective layer 7 can contain oxides or nitrides such as $SiO_2$, $Si_3N_4$, $Al_2O_3$, AlN, $ZrO_2$, ZrN, $HfO_2$, HfN, $TiO_2$, TiN, $Ta_2O_5$, TaN, $Nb_2O_5$, NbN, $Y_2O_3$, YN, MgO, fluorides such as $MgF_2$, LiF, $AlF_3$, $LaF_3$, $GdF_3$, semiconductors such as Si or SiC, conductive transparent such as ITO or AZO, or mixtures of these materials.

Preferably, there is a partial open area in the protective layer 7 in order to allow local direct access to the reactive multilayer system 3. This may be necessary for ignition of the reaction.

Figure 1G:
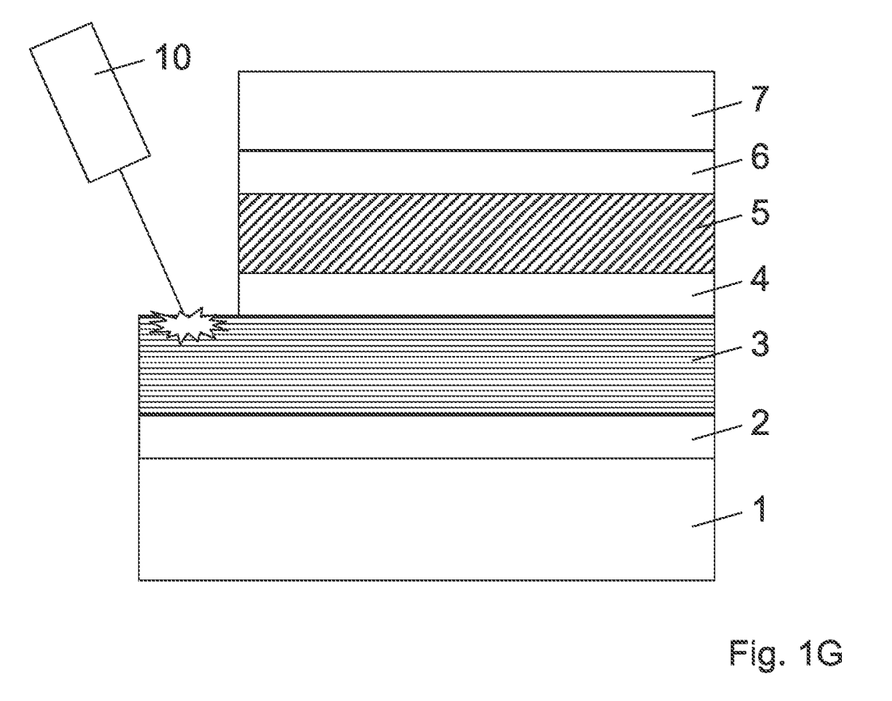

In a seventh step shown in FIG. 1G, the reaction of the reactive multilayer system 3 is ignited by an energy input, for example, by means of a laser 10 or application of electric voltage. In the self-propagating exothermic reaction occurring as a result, an amount of heat is released. The released amount of heat acts on the layers surrounding the reactive multilayer system 3, causing them to be modified. As this is a local heat input, the thermal load on the substrate 1 is so low that there is no warping and thus no deviation in shape.

Figure 2:
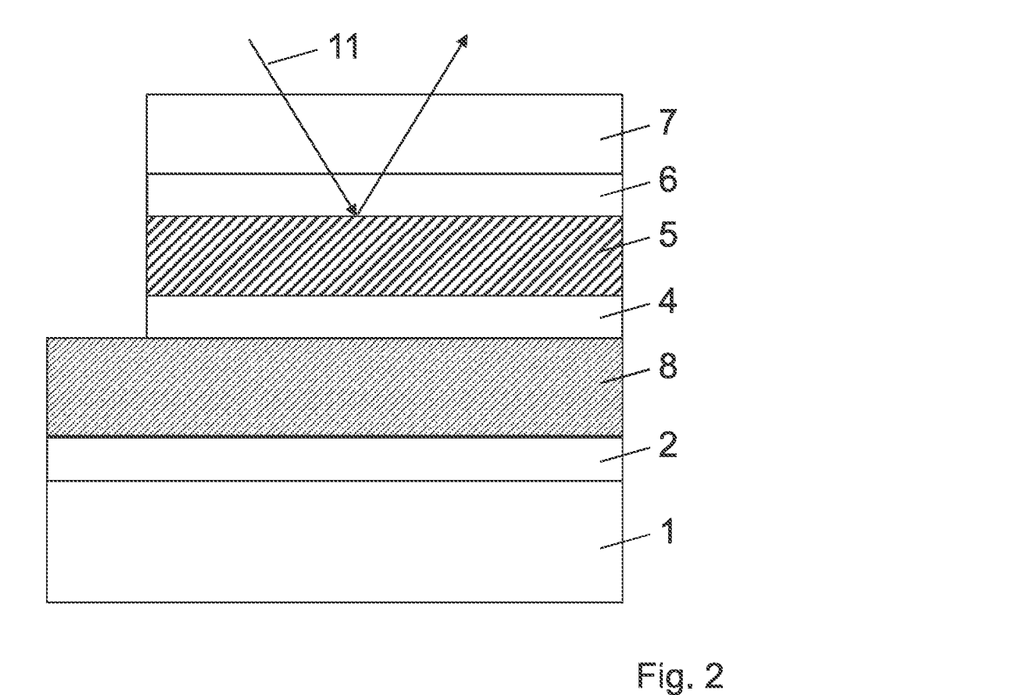
FIG. 2 shows a schematic representation of a section through a reflector element according to a first embodiment.

The reflector element produced in this manner is shown in FIG. 2. The reflector element contains a layer 8 produced by ignition of the reactive multilayer system, which comprises a compound of the layer material previously contained in the reactive multilayer system. More particularly, the layer 8 produced by ignition of the reactive multilayer system may contain at least one of the following compounds: $TiB_2$, $ZrB_2$, $HfB_2$, $VB_2$, $NbB_2$, $TaB_2$, TiC, ZrC, HfC, VC, NbC, TaC, $TiSSi_3$, $Zr_5Si_3$, $Hf_5Si_3$, $V_5Si_3$, $Nb_5Si_3$, $Ta_5Si_3$, TiAl, ZrAl, HfA, NiAl, PdAl, PtAl, ScAu, ScCu, ScAg, YAu, YCu, YAg, and RuAl.

In the embodiment of FIG. 2, the reflector element is a so-called front side reflector, in which an incident light beam 11 is reflected by the mirror layer 5 before it strikes the substrate 1. The third adhesive layer 6 and the protective layer 7 are advantageously transparent, so that the incident light beam 11 is not reflected until it strikes the mirror layer 5. In the embodiment of the reflector element as a front side reflector, the reactive multilayer system 3 or the layer 8 produced by ignition of the reactive multilayer system 3 are arranged between the substrate 1 and the mirror layer 5.

In the following, three examples A, B, C for the production of a reflector element will be described according to FIGS. 1A through 1G and 2.

Example A: Reflector Element with a Silver Coating and an $Al_2O_3$ Protective Layer In a first step, an adhesive layer 2 of Cr is applied to a substrate 1 for precision optical applications that has a polished technical-grade layer of NiP. In a second step, a reactive multilayer system 3 of Pd and Al is applied. The reactive Pd—Al multilayer system 3 is composed of a layer stack with 20 periods and a period thickness of 200 nm. A 10 nm thick Cr layer is applied to the reactive multilayer system 3 as a second adhesive layer 4, and a 150 nm thick Ag layer is deposited thereon as a mirror layer 5. An approx. 100 nm thick $Al_2O_3$ layer is deposited on the Ag layer 5 as a protective layer 7. After deposition of these layers, the reactive multilayer system 3 is ignited. Ignition of the reactive multilayer system 3 briefly produces an adiabatic temperature of up to 2380° C. This temperature is sufficient to melt the silver layer 5 applied to the reactive multilayer system 3 (melting point: 962° C.). The amorphous $Al_2O_3$ protective layer 7 applied to the silver layer 5 is also modified by the effect of heat. The amorphous $Al_2O_3$ protective layer 7 is converted to the more stable α-$Al_2O_3$ phase (phase transition at 750° C.-800° C. in PVD layers). By means of melting the Ag layer 5, an extremely smooth interface can be achieved on solidification on the protective layer 7 ($Al_2O_3$), which is advantageous for high and directed reflection. The conversion of the amorphous $Al_2O_3$ protective layer 7 to the more stable α-$Al_2O_3$ phase leads to substantially improved resistance. The α-$Al_2O_3$ phase shows substantially lower water-solubility than amorphous $A_2O_3$. The reflector thus shows improved stability compared to conventional reflectors, more particularly in moist environments.

Example B: Reflector Element with an Aluminum Coating and a Fluoride Protective Layer In a first step, a Ti adhesive layer 2 to 10 nm in thickness is applied to a polished substrate 1 composed, for example, of silicon, quartz glass or $CaF_2$. In a further step, a reactive multilayer system 3 is deposited on the Ti adhesive layer 2. The reactive multilayer system 3 is composed of a layer stack of alternating Ti layers and Al layers with 20 periods having a period thickness of 100 nm. A 50 nm to 200 nm thick Al layer is applied as a mirror layer 5 to the reactive multilayer system 3 by evaporation. A fluoride protective layer 7, for example, a $MgF_2$ layer or a combination of fluoride layers, one of which is a $MgF_2$ layer, is vapor deposited on the mirror layer 5 at a low process temperature (<150° C.). $MgF_2$ is transparent up to far into the deep UV range. It is known that by vapor deposition at high process temperatures, it is possible to achieve significantly reduced absorption of the layer and increased environmental stability. The reduced absorption and increased environmental stability of $MgF_2$ could also be achieved by means of subsequent annealing. However, this is frequently impossible due to temperature-sensitive substrates or resulting high thermal layer stress. Ignition of the reactive multilayer system 3 results in a local adiabatic temperature of 1227° C., causing the at least one fluoride layer to be converted to a stable state and simultaneously reducing the absorption of the fluoride layer in the deep UV region. For this reason, compared to conventional reflectors, the reflector shows improved stability, more particularly in moist environments.

Example C: Reflector Element with a Gold Layer

In a first step, by means of magnetron sputtering, an adhesive layer 2 of Cr or Ti is applied to a substrate 1 for precision optical applications that has a polished technological layer of NiP. In a second step, a reactive multilayer system 3 is applied that has a layer stack of alternating Pd layers and Al layers with 15 periods with the period thickness of 80 nm. On the reactive multilayer system 3, a thin Cr or Ti layer is applied as an adhesive layer 4, and a 350 nm thick Au layer is deposited thereon as a mirror layer 5 with a subsequent approx. 400 nm thick $Y_2O_3$ protective layer 7. After deposition of these layers, the reactive multilayer system 3 is ignited. Ignition of the reactive multilayer system 3 produces a local adiabatic temperature of up to 2380° C. The temperature is sufficient to briefly melt the gold, which is in direct contact with the reactive multilayer system 3. The amorphous $Y_2O_3$ protective layer 7 applied to the mirror layer 5 is also modified by the effect of heat. This allows a favorable adhesion of the mirror layer 5 to the substrate and the $Y_2O_3$ protective layer 7 to the mirror layer 5 of gold.

Figure 3:
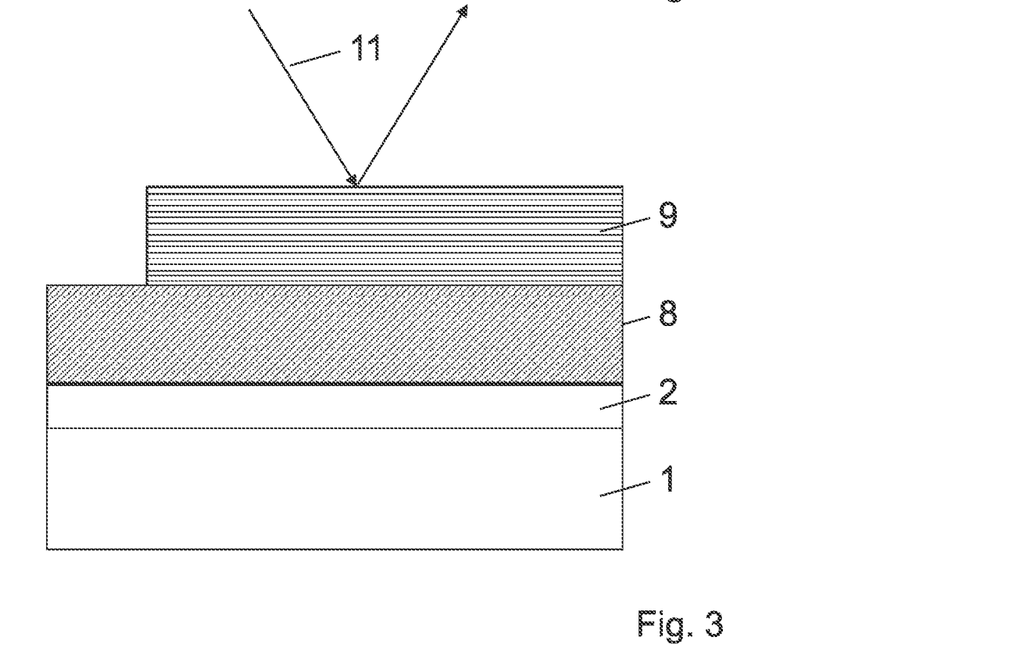
FIG. 3 shows a schematic representation of a section through a reflector element according to a second embodiment.

FIG. 3 shows an alternative embodiment of the reflector element in which the mirror layer is configured as a dielectric interference layer system 9. Production can essentially take place analogously to the method described above, wherein after the method step presented in FIG. 1C, the dielectric interference layer system 9 can be directly applied to the reactive multilayer system 3. In this embodiment, the second adhesive layer 4, the third adhesive layer 6 and the protective layer 7 can be dispensed with. In the completed reflector element, for example, the dielectric interference layer system 9 functioning as a mirror layer can be directly arranged on the layer 8 produced by ignition of the reactive multilayer system. As in the previous embodiment, the embodiment of FIG. 3 comprises a front side reflector in which an incident light beam 11, before striking the substrate 1, is reflected by the mirror layer in the form of the dielectric interference layer system 9.

Figure 4:
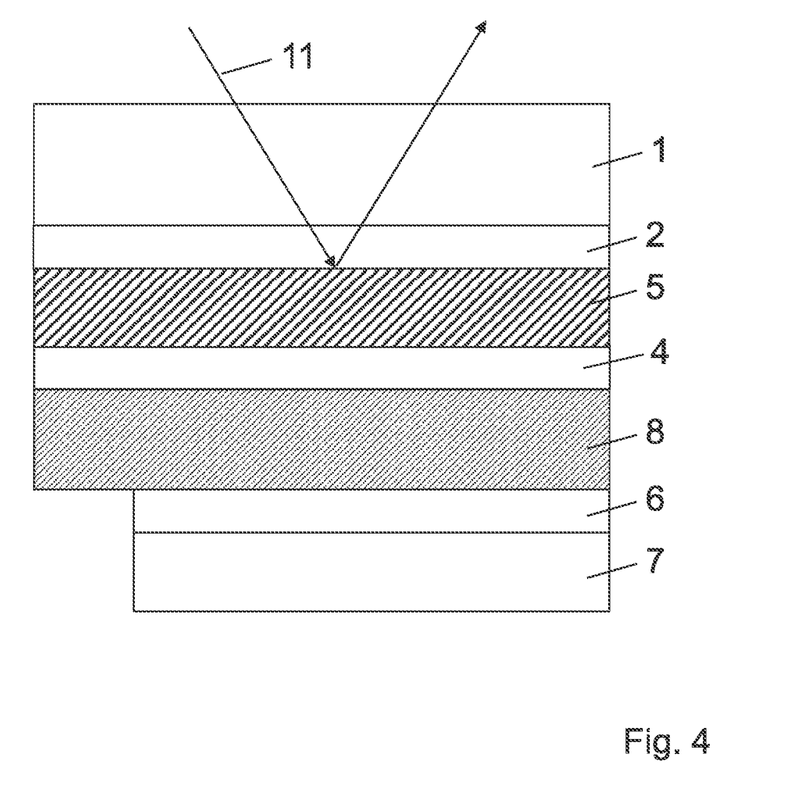
FIG. 4 shows a schematic representation of a section through a reflector element according to a third embodiment.

FIG. 4 shows a further possible embodiment of the reflector element. In this embodiment, the reflector element has a so-called back side reflector, in which an incident light beam 11 passes through the substrate 1 before being reflected by the mirror layer 5. The back side reflector differs from the front side reflector shown in FIG. 2 in its altered layer arrangement. For example, a layer sequence of the advantageously transparent first adhesive layer 2, the metal layer 5 as a mirror layer, the second adhesive layer 4, the layer 8 produced by ignition of the reactive multilayer system, the third adhesive layer 6 and the protective layer 7 is arranged on the substrate 1. In this embodiment, the mirror layer 5 is advantageously arranged between the substrate 1 and the layer 8 produced by ignition of the reactive multilayer system. The production of the back side reflector can take place analogously to the method steps described in connection with FIG. 1, with the exception of the different sequence of layers.

The invention is not limited by the description by means of the embodiments. Rather, the invention comprises every new feature and every combination of features, which more particularly includes every combination of features in the patent claims, even if said feature or combination per se is not explicitly mentioned in the patent claims or embodiments.

The invention claimed is:

1. A method for producing a reflector element, the method comprising:
   depositing a layer sequence on a substrate, wherein the layer sequence comprises at least one mirror layer and at least one reactive multilayer system; and
   igniting the reactive multilayer system in order to activate heat input in the layer sequence,
   wherein the heat input takes place into the mirror layer causing an increased reflectance of the mirror layer relative to a state of the mirror layer before the heat input.

2. The method according to claim 1, wherein the reactive multilayer system comprises a plurality of alternating layers of one of the following material pairs: Ti and B, Zr and B, Hf and B, V and B, Nb and B, Ta and B, Ti and C, Zr and C, Hf and C, V and C, Nb and C, Ta and C, Ti and Si, Zr and Si, Hf and Si, V and Si, Nb and Si, Ta and Si, Ti and Al, Zr and Al, Hf and Al, Ni and Al, Pd and Al, Pt and Al, Sc and Au, Sc and Cu, Sc and Ag, Y and Au, Y and Cu, Y and Ag, and Ru and Al.

3. The method according to claim 1, wherein the reactive multilayer system comprises at least 20 layers.

4. The method according to claim 1, wherein the reactive multilayer system comprises layers with thicknesses of between 5 nm and 500 nm.

5. The method according to claim 1, wherein the mirror layer comprises a metal layer.

6. The method according to claim 1, wherein the layer sequence comprises a protective layer arranged over the mirror layer, and wherein the protective layer is modified by the heat input.

7. The method according to claim 6, wherein the protective layer comprises $MgF_2$, $Y_2O_3$ or $Al_2O_3$.

8. The method according to claim 1, wherein the layer sequence has at least one adhesive layer.

9. The method according to claim 1, wherein the mirror layer comprises a dielectric interference layer system.

10. The method according to claim 1, wherein the mirror layer comprises a partial open area in order to allow direct access to the reactive multilayer system.

11. The method according to claim 1, wherein the reactive multilayer system comprises alternating layers of a first material and a second material, and wherein the first material layer and the second material layer are separated from each other by a diffusion barrier of a third material.

12. The method according to claim 11, wherein the third material is carbon.

* * * * *